April 7, 1936.  R. J. KEHL  2,036,733
WELDING OR CUTTING APPARATUS
Filed Nov. 23, 1931   3 Sheets-Sheet 1

INVENTOR:
Robert J. Kehl,
BY  ATTORNEYS
Byrnes, Townsend & Potter

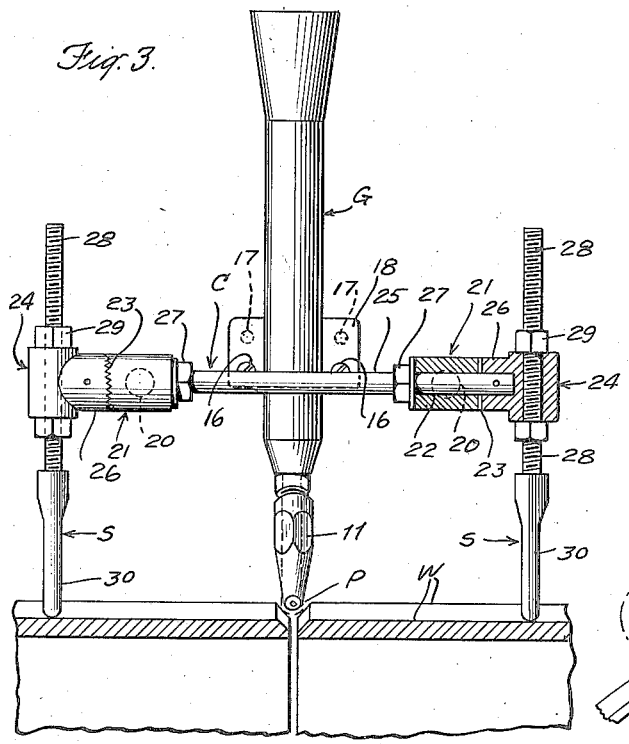
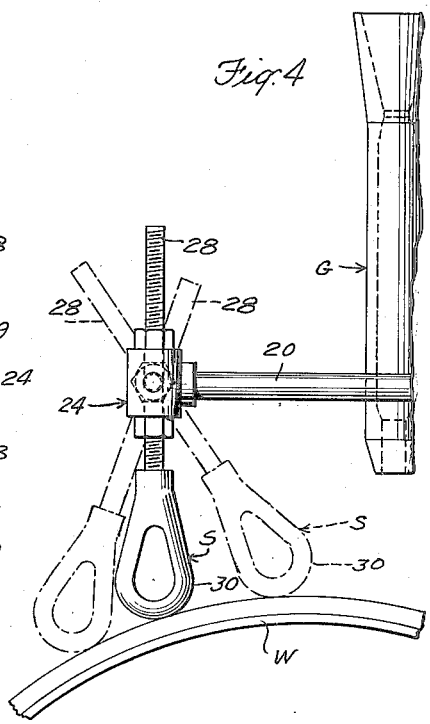
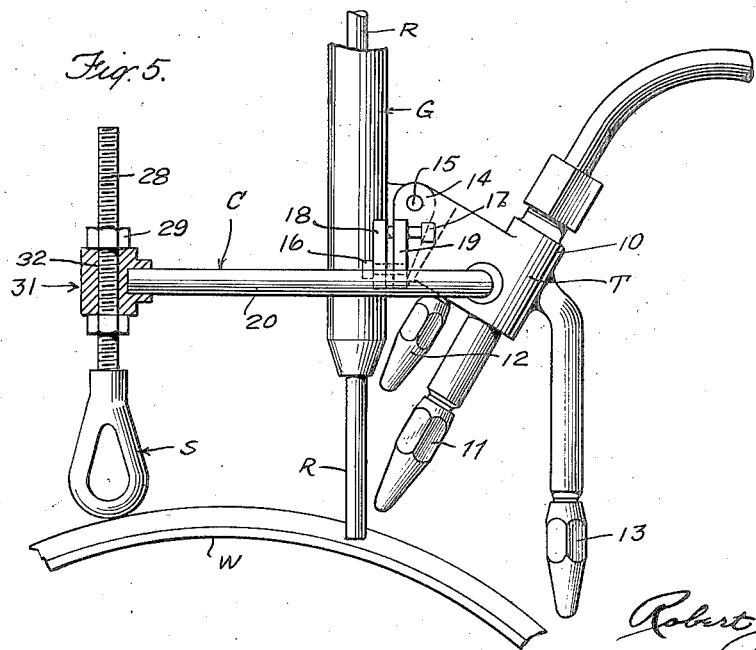

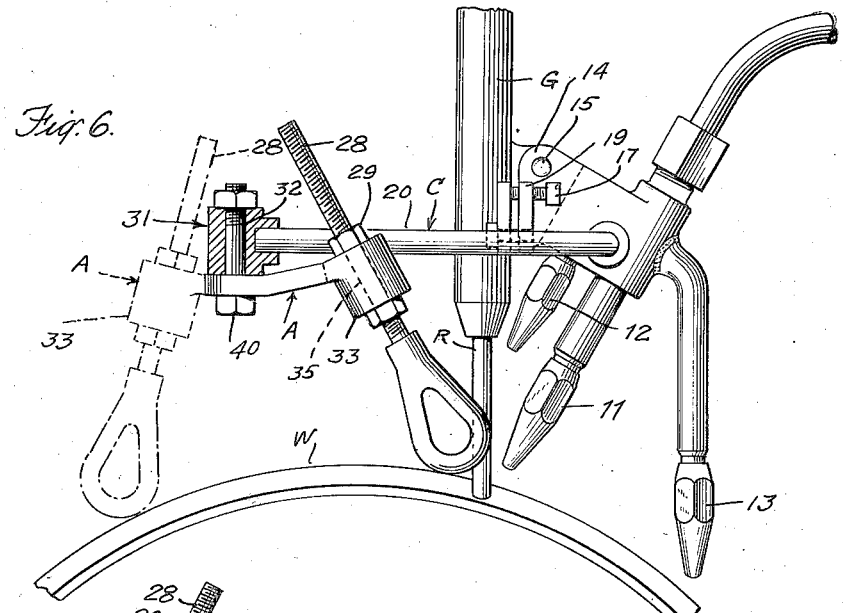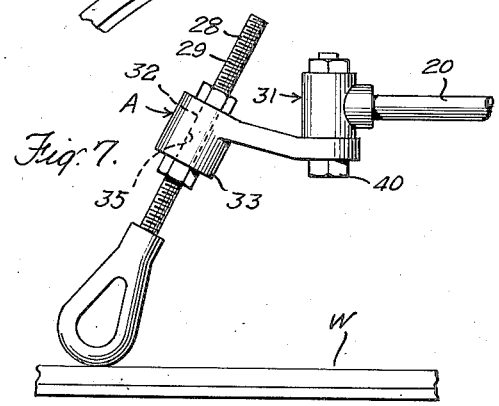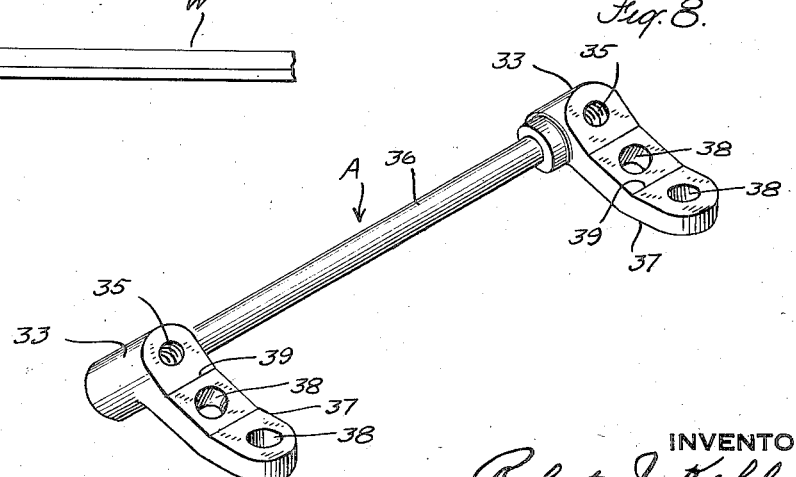

Patented Apr. 7, 1936

2,036,733

UNITED STATES PATENT OFFICE 2,036,733

WELDING OR CUTTING APPARATUS

Robert J. Kehl, Bayside, N. Y., assignor, by mesne assignments, to Union Carbide and Carbon Corporation, a corporation of New York Application November 23, 1931, Serial No. 576,894

30 Claims. (Cl. 113—59)

This invention relates to apparatus for applying heat to metallic objects as in welding, cutting, deseaming, surfacing and other such processes. More particularly, the invention is applicable to apparatus adapted for use in hand welding and of a character similar to and an improvement upon the welding apparatus disclosed in the copending application of M. J. Wall, Serial No. 552,467, filed July 22, 1931.

Apparatus of this character heretofore known comprises broadly: a heating unit, as an oxyacetylene torch or blowpipe, for creating a welding temperature at a welding point; a rod guide for directing a welding rod to said point; and a carriage having supports, as runners, adapted to contact with the work and to largely support the weight of the apparatus and at the same time to provide an axis about which the torch and the rod guide may be manipulated by means, such as a suitable handle, in controlling the condition and deposition of molten metal at the welding point. All of these parts have been heretofore rigidly connected together and, when so connected, are adapted for operation, with maximum efficiency, only within a limited range of the various work conditions met with by the welder. Such work conditions may present for example, variations in contours of work surfaces, as variations in the curvature of curved surfaces, variations in level between members being welded together, and some other conditions requiring skillful manipulation of the apparatus in welding. Apparatus, therefore, which is constructed in the above manner for efficient operation with one range of work conditions, as for certain range of curvatures in girth seam welding, will not be operable with equal efficiency, if at all, upon curvatures varying materially therefrom. In other words, if the curvature is of materially smaller or greater diameter than that for which the apparatus is adapted, the runners will not properly contact therewith so as to present the torch in effective welding relation to the work, the result being that the welding progress will be thereby retarded and the quality of the resulting weld impaired. To provide a special apparatus for every condition to be met with by the welder would involve prohibitive expenditure for welding equipment.

It is, therefore, a primary object of the present invention, to provide such apparatus with improved supporting means adapted to be accommodated to various surface contours of work and to various curvatures of such surfaces while at the same time presenting the heating unit in proper relation to the work for supplying heat to the work surface with maximum efficiency regardless of the contour of such work surface.

For the best results in welding, it is necessary that the welding rod be fed to the welding point in a definite fixed relation to the flame and that it be held accurately in such position throughout the welding operation. In compensating for manufacturing inaccuracies of the parts assembled in the apparatus, it has been heretofore necessary to bend the tips of the torch in order to establish this relationship. Such bending of the tips does not always give satisfactory results and in addition is likely to damage the tips and shorten their period of usefulness. Also, in adapting the apparatus to various conditions of work as to various thicknesses of material, it is desirable to interchangeably attach tips of varying size to the welding heat of the torch and, where these tips vary materially in size and particularly in length, it is obvious that the position of the guide tube suitable to properly feed a rod to the welding point for one length of tip will not properly feed for another.

It is a further object of the invention, therefore, to provide an improved connection between the torch and rod guide whereby these parts may be relatively adjustable to accurately compensate for inaccuracies in the manufacture of these parts and to adapt the feed of the rod guide to any variations in the size of tips used with the torch and whereby these parts may be rigidly held in their adjusted relation to each other.

A still further object of the invention is to provide apparatus of the above character having a rod guide adjustably mounted in relation to the heating unit to compensate for inaccuracies in manufacture of these parts, and for the interchangeable use of tips of various sizes with the torch, and having supports for the apparatus adaptable to various contours of work surface and adjustable compensatorily to the adjustment between the rod guide and the heating unit.

The apparatus in accordance with the invention may comprise a heating unit, as a torch or electrode, adapted to provide heat at a high temperature in a portion of a work surface and, in case of welding apparatus, a rod guide which may be pivotally connected to the heating unit for relative angular adjustment. The rod guide may be held rigidly in adjusted position relative to the heating unit by suitable means, as by screws extending through opposing ears extending from the respective elements and in push and pull relation with other screws extending through one ear of each pair. The apparatus may also be provided with runners suitably connected to the carriage preferably of a character to rest on a work surface with a slidable and rockable friction contact and both axially and angularly adjustable relative to the carriage for adapting the same to rest on various contours of work surface and on curvatures of various diameters, while at the same time presenting the torch in position for effective welding. The several adjustments may be effected variously as by pivoting suitable members on the carriage relative to which the runners are axially adjustable or by providing the carriage with means permitting axial adjustment of the runners relative thereto and an attachment adjustably mounted on the carriage interchangeably with the runners and to which the runners may be adjustably connected in a position on the attachment spaced from its connection with the carriage.

The above and further objects and advantages will appear from the following specification taken with the accompanying drawings in which, Fig. 1 is a perspective view of welding apparatus embodying the present invention, showing the same as used in welding on a curved surface.

Fig. 3 is a view thereof in rear elevation.

Fig. 4 is a view in side elevation showing in full and dotted lines various angles of adjustment of the runners adapting the apparatus to various curvatures of surfaces.

Fig. 5 shows a modification of the apparatus as shown in Figures 1 to 4 inclusive, and having runners adjustable only axially relative to the carriage.

Fig. 6 is a side elevation of the apparatus shown in Fig. 5 with an attachment substituted for the runners and having the runners mounted on the ends thereof.

Fig. 7 is a fragmentary view showing a further adjustment of the attachment.

Fig. 8 is a perspective view of an attachment for the apparatus shown in Fig. 5 and usable therewith in effecting various adjustments of the runners to the carriage.

The apparatus as shown in the above figures and as hereinafter described in detail is particularly adapted to hand welding apparatus although it is to be understood that features thereof are adaptable to a wide variety of applications in applying heat to metallic surfaces, either by means of a gas fed torch, by electrical means as an electric arc or other suitable means for providing high temperatures for welding, cutting, surfacing, deseaming and similar operations.

Figure 1:
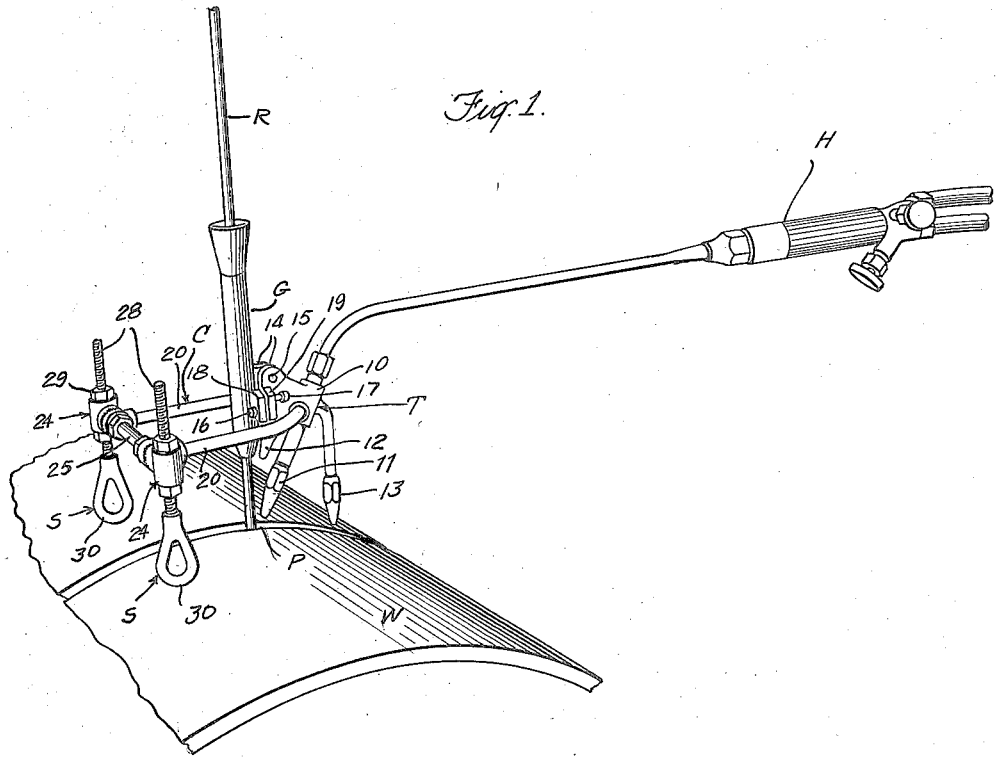
Figure 2:
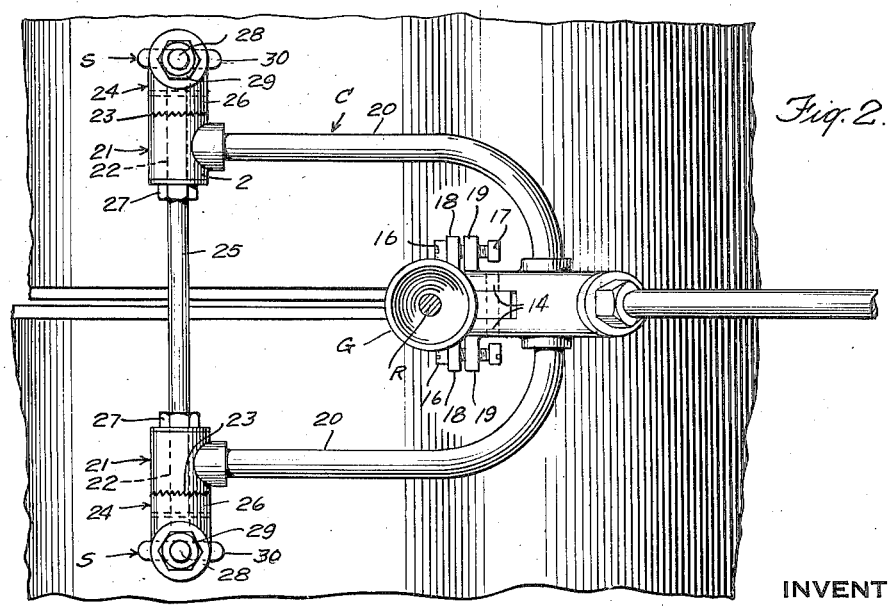
Fig. 2 is a plan view thereof.

The apparatus shown in Figs. 1 to 4 inclusive, comprises a heating unit, such as an oxy-acetylene blowpipe or torch T for supplying welding heat; a guide G for feeding the welding rod R to the welding point P, and preferably adjustably connected with the torch; a carriage C connected with the torch and having supports S including runners which are adjustably connected to the carriage and capable of adapting the same to rest on various contours of work surface for suitably presenting the torch and the welding rod R in proper relation to the work for effective welding. H designates the handle attached to the torch by the usual gas-conveying stem for manipulating the torch in controlling the welding operation.

The heating unit may be of any usual construction, and as shown comprises a welding head 10 which is independent of the guide G and arranged adjacent thereto. To the welding head 10 are detachably connected means for delivering jets of combustible gases to produce the heating flames. Gas from a suitable welding tip 11 produces a main welding flame which is delivered at an acute angle to the work for melting the end of the welding rod resting in the puddle at the welding point, and a smaller tip 12 is adapted to supply gas for directing a flame on the rod above the welding point to preheat the same to a degree short of its melting point. The main welding flame from the tip 11 usually supplies sufficient heat to prepare and preheat the sides of the groove formed between the edges to be welded. However, where the members being welded together are of comparatively great thickness or where higher welding speeds are desirable, an additional preheating flame may be employed which is directed on an unwelded portion of the seam at an acute angle to the work opposite to that of the main welding flame. The preheating flame may be provided by gas delivered from a tip 13 positioned adjacent to the tip 11 and spaced therefrom a sufficient distance so as to locally preheat the sides and bottom of the groove prior to application of the welding heat.

In order to compensate for tolerances and other manufacturing variables the guide G and torch may be connected for relative adjustment and, to this end, the rod guide is pivotally connected to the welding heat, as by interengaging fingers 14 and a detachable bolt 15 extending therethrough. The rod guide is angularly adjustable about this bolt by means of screws 16 and 17 in push and pull relation; the screws 16 extending through opposing pairs of ears 18 and 19 respectively extending from both sides of the rod guide and the welding head and rigid therewith. Screws 16 extend through both ears and have threaded engagement only with ears 19, while screws 17 are threaded through ears 19 and the ends of their shanks abut against the ears 18.

The carriage C comprises a pair of arms 20 extending rearwardly from the welding head, and bearing heads 21 are connected to the rear ends of these arms and have bores 22 extending therethrough transversely of the apparatus; the surfaces surrounding the bores being provided with milling 23. The supports S are connected in other heads 24 for axial adjustment relative thereto and these heads are connected by a cross bar 25 which is journaled in the bearing heads 21 for angular movement in unison forwardly and rearwardly with respect to the line of movement of the apparatus along a seam being welded. The ends of the bar 25 are rigidly connected to lateral extensions 26 from the heads 24 which extensions have milled surfaces opposed to and adapted to clutch with the milled surfaces 23 on the bearing heads 21. To hold the supports S in positions of angular adjustment, nuts 27 threaded onto the cross bar are adapted to press the heads 21 against the extensions 26 and force the cooperating milled surfaces into clutching engagement.

It is clear that, with the supports so mounted, the same may be angularly adjusted to adapt them to contact with various diameters of curved surfaces; and by mounting the supports in heads 24 for axial adjustment at points spaced from each other, the apparatus may be used on various contours of work surface with equal efficiency. For purposes of axial adjustment of the supports they are provided with shanks or stems 28 threadedly connected with the heads 24 and lock nuts 29 are provided above and below the heads 24 to secure the supports against shifting their position in heads 24. The supports include runners 30 which have curved portions to rockably support the apparatus on work so as to provide a sliding friction contact therewith and afford a fulcrum for operation of the torch. This construction of runners is particularly advantageous in operating on a curved surface since it is resistive to the tendency of the apparatus to slip down the incline thereof. It will be noted by reference to Figure 4, that the arms 20 are substantially perpendicular to the guide tube. This is important in apparatus of this character which is subject to rough usage, since should the arms become bent, it will be easy for the welder, judging with his eye to bend them back to correct position without the aid of templets or other accessories. The runners, which are disposed on opposite sides of the welding seam or working line with the curved portions in planes parallel to each other and to the direction of movement of the apparatus on the work, provide a two-point support for partially supporting the apparatus. The handle H extending from the heating unit, which is adapted to be grasped by an operator, provides a third point of support for the apparatus. It will therefore be seen that the runners or supports S, rod guide G, and tips 11, 12 and 13 are arranged successively in the order named, the runners S being spaced from the guide G at one side of the welding zone, and the handle H extending away from the apparatus in the direction from the welding zone opposite to that of the supports S.

Adaptation of the apparatus to various contours of work surface may be accomplished by other arrangements of elements than those described above and one alternative for the construction hereinbefore described is illustrated in Figs. 5 to 7 of the drawings. In the apparatus shown in Figure 5 the arms 20 of the carriage are provided at their rear ends with heads 31 having threaded axial bores 32 extending vertically therethrough and with which the threads of shanks 28 of the supports engage for axial adjustment as in the heads 24 described above. In order to provide for angular adjustment of the runners and to adapt them to curvatures of various diameter, there is provided an attachment A shown in perspective in Fig. 8. This attachment comprises a pair of heads 33 having threaded bores 35 therethrough for adjustably receiving the shanks 28 of the runners. The heads are preferably rigidly connected by a cross bar 36 and have straps 37 extending therefrom and lying parallel to each other.

The straps are each provided with a plurality of holes 38 spaced apart, with those in one strip lying opposite those in the other, and the straps are preferably slightly bent between adjacent holes as shown at 39 so that the portions of each strap containing the several holes will lie at an angle to each other. The heads 33 lie at an angle to the adjacent portions of the straps.

These straps are spaced apart a distance equal to that between the heads 31 and so that the holes may be brought into alignment with the bores 32 of said heads and the straps connected therewith in substitution for the runners, as by bolts 40. By this arrangement the runners may be adjusted to various positions forwardly or rearwardly of the heads 31 by reversal of the attachment A and the bends between the portions of the straps are at such angles as to properly present runners mounted in the heads 33 to curved surfaces for which the adjustment is suited.

The attachment as shown is adapted for two adjustments of the runners forwardly and two rearwardly of the heads 31 there being two holes in each strap, in all making the device capable of five positions of angular adjustment for the runners. It is obvious that the number of adjustments, to which the apparatus is capable, may be multiplied by increasing the number of holes. By this attachment, as well as by that shown in Figs. 1 to 4 inclusive, a lengthening or shortening of the leverage for manipulating the torch may be effected which is quite desirable under certain circumstances.

With the apparatus illustrated in Figs. 1 to 4, inclusive, the runners may be adjusted to any one of a large number of angular positions and the manipulating leverage for the torch may be increased or diminished by angular adjustment of the runners.

While the improvements disclosed herein as applied are shown in a hand-operable welding apparatus, it will be understood that they may be incorporated in machine welding apparatus as well as in other types of blowpipe apparatus such as both hand and machine operable gaseous cutting apparatus.

I claim:

1. In apparatus of the character described, a heating unit for providing a high temperature on a portion of a metallic surface, means including a plurality of spaced members connected to such heating unit for supporting the same, said members being angularly adjustable simultaneously in planes parallel to each other, and means for rigidly securing said members in various angular positions.

2. In welding apparatus, the combination of a heating unit for providing welding heat at a welding region in a seam adapted to be welded; and supporting means for said heating unit comprising a plurality of independent members adapted, when the apparatus is in an operative position, frictionally to contact and slide along the work on opposite sides of the seam; said members being adjustably connected to said unit at points spaced from each other and simultaneously movable in the same direction in planes parallel to the seam being welded.

3. Apparatus comprising the combination of a blowpipe adapted to be moved relatively to a working line on the work; supporting means for said blowpipe comprising a plurality of members adapted, when said apparatus is in an operative position, frictionally to contact and slide along the surface of the work on opposite sides of the working line; said members being angularly adjustable in planes extending substantially parallel to the working line; and a handle extending from said heating unit adapted to be grasped by an operator.

4. Apparatus comprising structure including a blowpipe for delivering a gaseous heating jet; and supporting means for such structure including a plurality of members having curved portions adapted, when said apparatus is in an operative position, frictionally to contact and slide along the surface of the work; said members being adjustably connected to said structure at points spaced from each other and having the curved portions thereof disposed in planes substantially parallel to the direction of relative movement between said apparatus and the work.

5. Apparatus comprising the combination of a blowpipe for applying a high temperature flame on work; a carriage; such blowpipe being mounted on said carriage; and means for supporting at least part of the weight of said carriage comprising a plurality of members having the extreme ends thereof adapted, when said apparatus is in an operative position, frictionally to contact and slide along the work at one side of the point of application of said flame; said members being adjustably connected to said carriage at points spaced from each other; and means at the opposite side of the point of application of said flame on the work, adapted to be grasped by an operator, for rocking said apparatus about the contact of said supporting members with the work.

6. In welding apparatus, the combination of a heating unit for providing welding heat at a welding region in a seam adapted to be welded; and non-rotary supporting means for said heating unit comprising a plurality of members adapted, when the apparatus is in an operative position, frictionally to contact and slide along the work on opposite sides of the seam; said members being connected to said unit at points spaced from each other and each of said members being independently axially adjustable.

7. In welding apparatus, the combination of a heating unit for providing welding heat at a welding region in a seam adapted to be welded; and supporting means for said heating unit comprising a plurality of independent members adapted, when the apparatus is in an operative position, to contact and move along the work at opposite sides of the seam; said members being connected to said unit at points spaced from each other and axially and angularly adjustable in parallel planes substantially perpendicular to the work.

8. In welding apparatus, the combination of a heating unit for providing welding heat at a welding point in a seam to be welded, a guide for directing a welding rod to such point, means for adjusting the relative position of said heating unit with respect to said guide and for maintaining said heating unit and said guide in fixed relation during welding, and means including a plurality of angularly adjustable members adapted to straddle the seam for supporting said heating unit and said guide on the work.

9. The combination with means adapted to deliver a gaseous heating jet; of a carriage upon which said means is mounted, said carriage including axially and angularly adjustable means supporting the same on the work at one side of the zone heated by said jet; and means at the opposite side of the zone heated by said jet, adapted to be grasped by an operator, for oscillating said jet delivering means about an axis determined by the line of contact of said adjustable means on the work.

10. In welding apparatus, the combination of a welding unit comprising means for providing welding heat at a welding point; means for providing heat a substantial distance from and to one side of the welding point; and means adapted to support at least part of the weight of said unit upon the work at the side of the welding point opposite to that where heat is provided a substantial distance from the welding point.

11. In welding apparatus, the combination of a welding unit comprising means for applying welding heat at a welding point and additional means for applying localized heat at a substantial distance from and ahead of the welding point; means adapted to fulcrum and slidably support at least part of the weight of said unit upon the work at the opposite side of the welding point from that where localized heat is applied; and means, adapted to be grasped by an operator, whereby said unit is movable along the surface of the work and rockable on such fulcrum.

12. In welding apparatus, the combination of supporting means forming a fulcrum; means for guiding a welding rod to a welding region on the work; means for applying welding heat to said welding region; means for locally preheating an unwelded portion of the work; such fulcrum, guiding means, welding-heat applying means, and preheating means being arranged successively in the order named with said guiding means spaced from said fulcrum; and means adapted to be grasped by an operator for moving said guiding means, welding heat applying means, and preheating means about said fulcrum during welding.

13. In welding apparatus, the combination of means for guiding a welding rod to a welding point; means for locally preheating the work to be welded; means for applying welding heat to said welding point and to a region on the work between the rod guided by such guiding means and the part of the work preheated by such preheating means; and means for supporting directly upon the work at least part of the weight of the several aforementioned means.

14. In welding apparatus, the combination of means for guiding a welding rod toward the work; means including a structure independent of said guiding means and arranged adjacent thereto for providing a welding flame and a preheating flame; said structure being so constructed and arranged that the welding flame produced thereby is directed on a seam of the work and at an angle thereto and forms a welding region at a point where the welding rod contacts the work, and that the preheating flame produced thereby is directed on an unwelded portion of the seam close to the point where the welding rod contacts the work and at an angle to the work opposite to that of the welding flame.

15. In welding apparatus, the combination of means for guiding a welding rod to the welding point of a seam to be welded; and a structure independent of said guiding means and secured thereto and provided with a plurality of passages having outlets for providing a welding flame and a preheating flame; said structure and the passages therein being so constructed and arranged that the welding flame produced thereby is directed to the welding point and the preheating flame produced thereby is directed on the seam at a point close to the welding point but inclined in a direction from the welding point and along an unwelded portion of the seam.

16. In manually operable welding apparatus, a blowpipe for supplying a combustible gas, a handle for said blowpipe adapted to be grasped by an operator, means for partially supporting said blowpipe on the work, such blowpipe comprising a head provided with a nozzle having an outlet adapted to deliver a preheating flame, and a second nozzle provided with an outlet adapted to deliver a welding flame, said nozzles being disposed adjacent to one another and said outlets being spaced apart such a distance that the unwelded work will be locally preheated by said preheating flame before such work is subjected to said welding flame.

17. Welding apparatus comprising structure including means for guiding a welding rod to a welding region in a seam in work; means for applying welding heat to said region; means for locally preheating an unwelded portion of the seam; such guiding means, welding heat applying means, and preheating means being arranged successively in the order named; and supporting means for said structure comprising a plurality of spaced runners adapted to straddle the seam; said runners having curved portions adapted frictionally to contact and slide along the surface of the work.

18. Apparatus according to claim 17 having two such runners to provide a two point support for said guiding means, welding heat applying means and preheating means; and means including a handle, extending from said structure, adapted to be grasped by an operator to provide a third point of support for said apparatus.

19. Welding apparatus comprising structure including means for guiding a welding rod to a welding region in work; means for applying welding heat to said region; means for locally preheating an unwelded portion of the work; such guiding means, welding heat applying means, and preheating means being disposed in the same plane and arranged successively in the order named; supporting means for said aforementioned means comprising spaced runners adapted to contact and slide along the surface of the work, and a handle extending from said structure in the same direction as said preheating means is with respect to said guiding means.

20. Apparatus according to claim 19 in which said runners have curved portions disposed in planes substantially parallel to said handle; said handle having at least one passage therein communicating with such welding heat applying means and said preheating means for delivering a combustible gas thereto.

21. A manually operable welding apparatus comprising structure including means for guiding a welding rod to a welding point in a seam to be welded; means for applying a heating flame upon the welding rod before it reaches the welding point; means for applying a second heating flame upon the welding point; means for applying a third heating flame upon an unwelded portion of the seam to preheat the same; said guiding means and said three flame-applying means being arranged successively in the order mentioned; supporting means for said guiding means and all of said frame-applying means comprising a plurality of spaced runners adapted to straddle the seam; said runners having curved portions adapted to contact and slide along the surface of the work; and a handle extending from said structure in the same direction as said three flame-applying means are with respect to said guiding means.

22. Apparatus according to claim 21, in which said handle serves as a blowpipe handle; such handle having at least one passage therein communicating with said three flame-applying means for delivering a combustible gas thereto.

23. Apparatus comprising the combination of means for providing a high temperature heat on a metallic surface, a carriage for such heating means including a pair of arms extending from such heating means and having the end portions thereof substantially parallel and in spaced relation, supports for said carriage, and means for connecting said supports to the ends of said arms, said supports being adjustable with respect to said arms.

24. In apparatus of the character described, means for providing a high temperature in a region on work surface; arms, having bearings at their ends, extending from said means; and means including a plurality of members and an element extending through said bearings for supporting said apparatus; said members being maintained in spaced relation and angularly movable in planes parallel to each other.

25. In apparatus of the character described, means for providing a high temperature in a portion of a metallic surface; elements having clutching surfaces; spaced supports connected to said elements and provided with clutching surfaces adapted to co-act with the clutching surfaces on said elements; said supports being angularly adjustable in planes parallel to each other; and means including said clutching surfaces for maintaining said supports in various angular positions.

26. In apparatus of the character described, means for providing a high temperature in a portion of a metallic body; arms extending from said means and terminating in tubular heads each having a milled end; supports journaled in said heads and having milled surfaces in opposition to the milled ends of the heads; and means for forcing the milled surfaces into engagement for locking the supports in various angular positions.

27. In welding apparatus, a heating unit for providing welding heat at a welding point; a carriage secured to said heating unit; members adjustably mounted on said carriage for supporting the same on the work; an attachment adapted to be connected with said carriage interchangeably with said supporting members; and means for connecting said supporting members to the attachment in spaced relation to the position of the connection of the attachment to said carriage.

28. In welding apparatus, the combination of a heating unit for providing welding heat at a welding point; and attachment means adapted to be connected to the apparatus and so constructed that the relative position thereof on the apparatus can be changed in a direction parallel to the seam; and members mounted on the attachment means and axially adjustable thereon for supporting the apparatus on the work.

29. Welding apparatus comprising the combination of a frame and supporting members; means including an attachment, extending longitudinally of said apparatus and having a bent portion, adapted to be connected to said supporting members and also at different positions to said frame so as to present said supporting members at various angles to said frame.

30. In welding apparatus, the combination of a heating unit for providing welding heat at a welding point; a carriage secured to the apparatus having apertures therein, an attachment having a plurality of apertures adapted to be aligned with the apertures of the carriage; means adapted to extend through the apertures for connecting the carriage and attachment together; said attachment being angularly bent between said apertures taken in pairs; and supports secured to the attachment.

ROBERT J. KEHL.